United States Patent
Buck et al.

(10) Patent No.: US 9,350,693 B2
(45) Date of Patent: May 24, 2016

(54) METHOD AND APPARATUS FOR CROSS DEVICE NOTIFICATIONS

(71) Applicant: Lookout, Inc., San Francisco, CA (US)

(72) Inventors: Brian James Buck, Livermore, CA (US); David Luke Richardson, San Francisco, CA (US)

(73) Assignee: LOOKOUT, INC., San Francisco, CA (US)

( * ) Notice: Subject to any disclaimer, the term of this patent is extended or adjusted under 35 U.S.C. 154(b) by 556 days.

(21) Appl. No.: 13/717,292

(22) Filed: Dec. 17, 2012

(65) Prior Publication Data
US 2014/0173026 A1 Jun. 19, 2014

(51) Int. Cl.
*G06F 15/16* (2006.01)
*H04L 12/58* (2006.01)

(52) U.S. Cl.
CPC ..................... *H04L 51/24* (2013.01)

(58) Field of Classification Search
CPC ........................................ H04L 51/24
USPC ........... 709/204, 206, 207, 217, 219; 719/318
See application file for complete search history.

(56) References Cited

U.S. PATENT DOCUMENTS

| | | | |
|---|---|---|---|
| 7,509,304 B1 * | 3/2009 | Pather et al. | |
| 8,806,647 B1 | 8/2014 | Daswani et al. | |
| 8,825,836 B1 * | 9/2014 | Gibson et al. | 709/224 |
| 8,838,713 B2 * | 9/2014 | Moore | 709/206 |
| 2014/0047019 A1 * | 2/2014 | Midtun | 709/204 |

OTHER PUBLICATIONS

"PushBullet API" PushBullet.com; <https://www.pushbullet.com/api>; Published Jan. 20, 2013; pp. 1-6.
"Turn on or off Unified Messaging Notifications" for Outlook 2010, Microsoft Corp., <office.microsoft.com/en-us/outlook-help/turn-on-off-unified-messaging-notifications-HA101864166.aspx>; © 2013 Microsoft Corp., Retrieved Feb. 20, 2013; pp. 1 of 1.
"Turn Desktop Alerts on or off" for Outlook 2007, Microsoft Corp., <office.microsoft.com/en-us/outlook-help/turn-desktop-alerts-on-or-off-HA010098670.aspx>; © 2013 Microsoft Corp., Retrieved Feb. 20, 2013; pp. 1-2.
"Setting Notifications" Princeton University; <www.princeton.edu/um/FAQ/setting-your-preferences/setting-notifications/>; Revised Mar. 27, 2012, © 2013 Princeton University; pp. 1-3.
"Notification Programming Topics" © 2009 Apple Inc., Published Aug. 18, 2009; pp. 1-23.
"Local and Push Notification Programming Guide" © 2011 Apple Inc., Published Aug. 9, 2011; pp. 1-56.
Lightner, Rob, "How to get Android notifications in Windows", Aug. 23, 2012, pp. 1-3 available at http://www.cnet.com/how-to/how-to-get-android-notifications-in-windows/.
"DeskNotifier Free", Google Play App Store, retrieved on Apr. 7, 2016 available at https://play.google.com/store/apps/details?id=de.elfsoft.desknotifier.
"DeskNotifier" retrieved on Apr. 1, 2016 available at http://en.desknotifier.clemens-elflein.de/functions.php.

* cited by examiner

Primary Examiner — Viet Vu
(74) Attorney, Agent, or Firm — Dergosits & Noah LLP

(57) ABSTRACT

A method and apparatus for providing cross device notifications. A cross notification component is provided in multiple devices. In some devices, the cross notification component is at least configured to transmit notices to other devices, and to receive responses to its notice transmissions. In some devices, the cross notification component is at least configured to receive the notices transmitted by other devices, and to generate and transmit responses to received notices.

25 Claims, 8 Drawing Sheets

```xml
<notification>
  <display>
    <p>test appointment</p>
    <p>Start time: Thursday, November 15, 2012, 9:00 AM</p>
    <notificationList>
      <notificationHeading>
        <notificationColumn>Subject</notificationColumn>
        <notificationColumn>Due in</notificationColumn>
      </notificationHeading>
      <notificationItems>
        <notificationItem id="NI01">
          <notificationColumn>test appointment 2</notificationColumn>
          <notificationColumn>14 minutes overdue</notificationColumn>
        </notificationItem>
        <notificationItem id="NI02">
          <notificationColumn>test appointment</notificationColumn>
          <notificationColumn>43 minutes overdue</notificationColumn>
        </notificationItem>
      </notificationItems>
    </notificationList>
    <notificationReponseList>
      <response value="dismiss" target="selected">Dismiss</response>
      <response value="dismissAll" target="all">Dismiss All</response>
      <response value="snooze" target="selected">Snooze
        <choices>
          <choiceItem>5 minutes</choiceItem>
          <choiceItem>10 minutes</choiceItem>
        </choices>
      </response>
      <response value="open" target="selected">Open Item</response>
    </notificationReponseList>
  </display>
  <notificationActions>
    <notificationAction ID="NI01">
      <message>reponse text</message>
      <location>deviceLocationOrIdentifier</location>
    </notificationAction>
    <notificationAction ID="NI02">
      <message>reponse text</message>
      <location>deviceLocationOrIdentifier</location>
    </notificationAction>
  </notificationActions>
</notification>
```

FIG. 8

METHOD AND APPARATUS FOR CROSS DEVICE NOTIFICATIONS

COPYRIGHT NOTICE

A portion of this patent disclosure contains material which is subject to copyright protection. The copyright owner has no objection to the facsimile reproduction by anyone of the patent disclosure, as it appears in the records of the U.S. Patent & Trademark Office, but otherwise reserves all rights.

TECHNICAL FIELD

This disclosure relates generally to mobile communications devices, and more particularly, to devices, methods and systems for providing cross device notices for multiple mobile communications devices.

BACKGROUND

The use of mobile communications devices continues to experience astronomical growth. Factors contributing to this growth include advancements in network technologies, lower data usage costs, and the growing adoption of smartphones, such as Android®- and Apple®-based smartphones. As a result, many users now have multiple computer-based electronics devices, many or all of which are in use and operating at one time, such as a smartphone, a laptop computer, a desktop computer, a tablet, etc. Any of these devices could be, at any given moment, the device with which the user is interacting.

A user may have an applications installed on multiple devices, and each instance of the application thus displays the same notifications for each device. Typically, a user would have to view and respond to each of these notifications separately for each device. A user may also not have an application installed on all (or a subset) of the user's multiple devices, and perhaps only on one such device. Regardless, the user still wants to receive and respond to notifications from any of the user's applications on multiple devices regardless of which device the user is currently employing.

Thus, it would be desirable to have a universal cross device notification capability for multiple devices, whereby a user attending to one device can view and respond on that device to notifications from all devices.

BRIEF DESCRIPTION OF THE DRAWINGS

This disclosure is illustrated by way of example and not limitation in the figures of the accompanying drawings, in which like references indicate similar elements, and in which:

FIG. 8 is an example program listing for building a structured notice.

DETAILED DESCRIPTION

Figure 1:
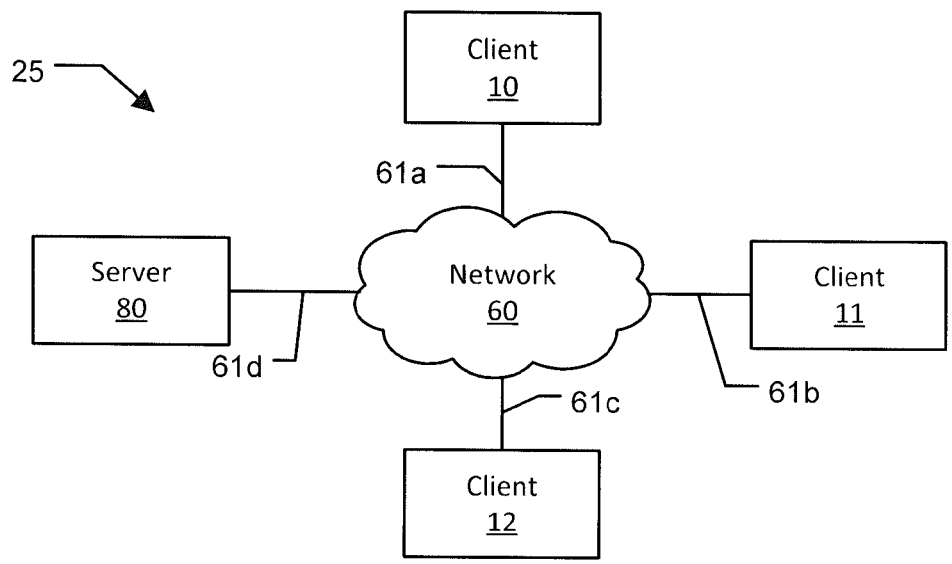
FIG. 1 is a simplified block diagram illustrating a distributed computing system.

This disclosure describes systems and methods for providing cross device notifications among multiple devices. Each of the devices includes a cross notification component, or at least enough of a component to interact with a hosted service that manages such notifications. An originating device generates native notifications, and the cross notification component is configured to transmit notices, which may be the native notification or a reformatted notice, to other devices, as configured by a user or administrator. The originating device is also configured to receive responses to its notices, as well as receiving responses from notices of other originating devices. In non-originating devices, the cross notification component is configured to receive the notices transmitted by originating devices, and to generate and transmit responses to received notices, or to receive responses to notices generated by other devices.

1. Hardware/Software Environment

Embodiments of this disclosure can be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein. The mobile communications devices described herein are computer-based devices running an operating system for use on handheld or mobile devices, such as smartphones, PDAs, tablets, mobile phones and the like. For example, a mobile communications device may include devices such as the Apple iPhone®, the Apple iPad®, the Palm Pre™, or any device running the Apple iOS™, Android™ OS, Google Chrome OS, Symbian OS®, Windows Mobile® OS, Palm OS® or Palm Web OS™.

In the context of this disclosure, a computer usable medium or computer readable medium may be any non-transitory medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer readable instructions may be referred to herein as components or modules or data objects or data items. Applications may be hardwired or hard coded in hardware or take the form of software executing on a general purpose computer such that when the software is loaded into and/or executed by the computer, the computer becomes an apparatus for practicing embodiments of the disclosure. Applications may also be downloaded in whole or in part through the use of a software development kit or toolkit that enables the creation and implementation of an embodiment of the disclosure. In this specification, these implementations, or any other form that an embodiment of the disclosure may take, may be referred to as techniques. In general, the order of the steps of disclosed processes may be altered within the scope of the disclosure.

As used herein, the term "mobile communications device" generally refers to mobile phones, PDAs, smartphones and tablets, as well as embedded or autonomous objects and devices that make up the nodes or endpoints in the "Internet of Things." The term "mobile communications device" also refers to a class of laptop computers which run an operating system that is also used on mobile phones, PDAs, or smartphones. Such laptop computers are often designed to operate with a continuous connection to a cellular network or to the internet via a wireless link. The term "mobile communications device" excludes other laptop computers, notebook computers, or sub-notebook computers that do not run an operating system that is also used on mobile phones, PDAs, and smartphones. Specifically, mobile communications devices include devices for which wireless communications services such as voice, messaging, data, or other wireless Internet capabilities are a primary function. As used herein, a "mobile communications device" may also be referred to as a "device," "mobile device," "mobile client," or "handset." However, a person having skill in the art will appreciate that while the present invention is disclosed herein as being used on mobile communications devices, the present invention may also be used on other computing platforms, including desktop, laptop, notebook, netbook or server computers.

As used herein, the term "client computer" refers to any computer, embedded device, mobile device, or other system that can be used to perform the functionality described as being performed by the client computer. Specifically, client computers include devices which can be used to display a user interface by which the functionality provided by the server can be utilized by a user. Client computers may be able to display a web page, load an application, load a widget, or perform other display functionality that allows the client computer to report information from the server to the user and to receive input from the user in order to send requests to the server.

FIG. 1 is a simplified block diagram of a distributed computer network 25 having a number of client systems 10, 11 and 12, and a server system 80, all coupled to a communications network 60 via a plurality of communications links 61. Communications network 60 provides a mechanism for allowing the various components of distributed network 25 to communicate and exchange information with each other.

Communications network 60 may itself be comprised of many interconnected computer systems and communications links. Communications links 61 may be hardwire links, optical links, satellite or other wireless communications links, wave propagation links, or any other mechanisms for communication of information. Various communications protocols may be used to facilitate communication between the various systems shown in FIG. 1. These communications protocols may include TCP/IP, HTTP, WAP, vendor-specific protocols, customized protocols, Internet telephony, IP telephony, digital voice, voice over broadband (VoBB), broadband telephony, Voice over IP (VoIP), public switched telephone network (PSTN), and others. In one embodiment, the communications network 60 is the Internet, while in other embodiments, the communications network may be any suitable communications network including a local area network (LAN), a wide area network (WAN), a wireless network, an intranet, a private network, a public network, a switched network, and combinations of these, and the like.

Distributed computer network 25 in FIG. 1 is merely illustrative of one embodiment and not intended to be limiting. One of ordinary skill in the art would recognize other variations, modifications and alternatives. For example, more than one server system 80 may be connected to the communications network 60, and other computing resources may be available to the server or the network. As another example, any number of client systems 10, 11 and 12 may be coupled to communications network 60 via an access provider (not shown) or some other server system.

A client system typically requests information from a server system, which then provides the information in response. Server systems typically have more computing and storage capacity than client systems. However, any computer system may act as either a client or server depending on whether the computer system is requesting or providing information. Aspects of the systems and methods described herein may be embodied in either a client device or a server device, and may also be embodied using a client-server environment or a cloud-cloud computing environment.

In the configuration of FIG. 1, server 80 is responsible for (i) receiving information requests from any of client systems 10, 11 and 12, (ii) performing processing required to satisfy the requests, and (iii) forwarding the results corresponding to the requests back to the requesting client system. The processing required to satisfy the request may be performed by server system 80 or may alternatively be delegated to other servers or resources connected to server 80 or communications network 60.

Client systems 10, 11 and 12 enable users to access and query information or applications stored by or accessible through server system 80. Some example client systems include desktop computers, portable electronic devices (e.g., mobile communication devices, smartphones, tablet computers, laptops) such as the Samsung Galaxy Tab®, Google Nexus devices, Amazon Kindle®, Kindle Fire®, Apple iPhone®, the Apple iPad®, Microsoft Surface®, the Palm Pre™, or any device running the Apple iOS™, Android™ OS, Google Chrome OS, Symbian OS®, Windows Mobile® OS, Windows Phone, BlackBerry OS, Embedded Linux, webOS, Palm OS® or Palm Web OS™.

In one embodiment, a web browser application executing on a client system enables users to select, access, retrieve, or query information and/or applications stored by or accessible through server system 80. Examples of web browsers include the Android browser provided by Google, the Safari® browser provided by Apple, Amazon Silk® provided by Amazon, the Opera Web browser provided by Opera Software, the BlackBerry® browser provided by Research In Motion, the Internet Explorer® and Internet Explorer Mobile browsers provided by Microsoft Corporation, the Firefox® and Firefox for Mobile browsers provided by Mozilla®, and others (e.g., Google Chrome).

Figure 2:
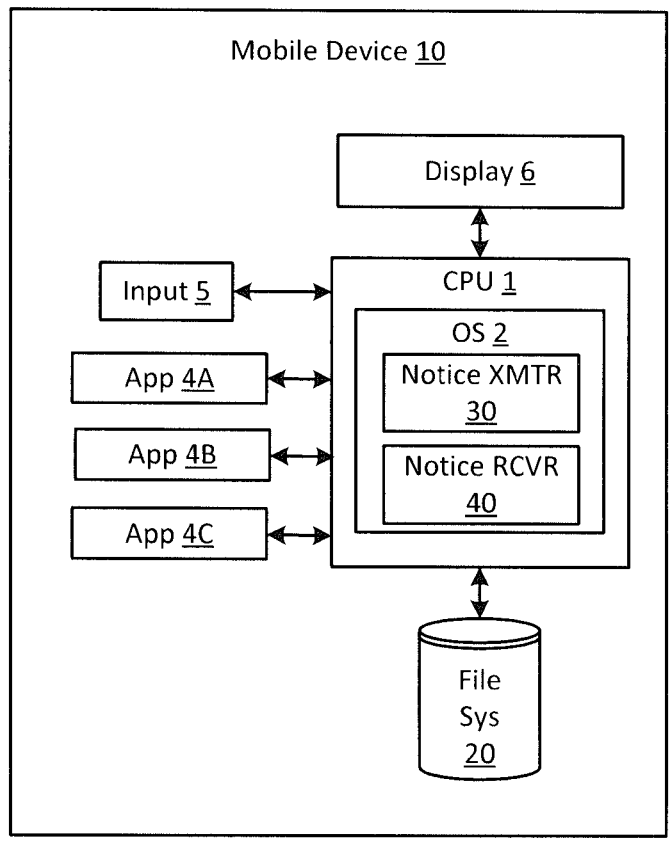
FIG. 2 is a block diagram illustrating one embodiment of a mobile communications device.

FIG. 2 shows client device 10 embodied as a mobile communications device. In various embodiments described herein, a user can interface with other devices, networks, systems, etc., through mobile communications device 10. Mobile communications device 10 is a processor-based computing device having a central processing unit (CPU) 1 controlled through an operating system (OS) 2, which provides the interface for hardware and software operations on the device, including various applications 4, input device(s) 5, display 6 and file system 20.

Input device 5 may include a touchscreen (e.g., resistive, surface acoustic wave, capacitive sensing, infrared, optical imaging, dispersive signal, or acoustic pulse recognition), keyboard (e.g., electronic keyboard or physical keyboard), buttons, switches, stylus, or combinations of these.

File system 20 is provided for mass storage, which for a mobile communications device may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

A notice transmitter component 30 is provided for transmitting notices to other devices. The notice transmitter component 30 is preferably fully integrated with the OS 2, but could also be provided as a separate application or as a program module interacting with a server-based application. A notice receiving component 40 is provided for transmitting notices to other devices. notice receiving component 40 is also preferably fully integrated with the OS 2, but could also be provided as a separate application or as a program module interacting with a server-based application. The notice transmitter component 30 and the notice receiving component 40 can be fully integrated as a single functional cross-notification component in OS 2, but some devices may have only the transmitter component enabled while other devices have only the receiver component enabled.

For each device from which the user wants notifications transmitted to other devices, the cross-notification component is at least enabled as a notification transmitter. These devices will generate native notifications, i.e., notifications generated by the OS or by an application running on the OS, and will transmit or broadcast such notifications to other devices, as well as generate a local display of the notifications in accord with configuration settings. In one embodiment, the notifications are formatted either by the transmitter component or the receiver component, for example, as simple notices, or complex notices, or structured notices, although such formatting may not be necessary if other devices are running the same application or the same operating system.

For each device from which the user wants to receive notifications from other devices, the cross-notification component is at least enabled as a notification receiver. Further, both of the transmitter and receiver components are enabled to provide and receive responses to notifications, and to apply the responses on the device locally.

Also included in mobile communications device 10 but not shown in FIG. 1 are familiar computer components, such as memory, battery, speaker, microphone, RF transceiver, antenna, ports, jacks, connectors, camera, input/output (I/O) controller, display adapter, network interface, and the like.

The techniques described herein may be used with computer systems having different configurations, e.g., with additional or fewer components or subsystems. For example, a computer system could include more than one processor (i.e., a multiprocessor system, which may permit parallel processing of information) or a system may include a cache memory. The computer device shown in FIG. 2 is but one example of a computer system suitable for use. Other configurations of subsystems suitable for use will be readily apparent to one of ordinary skill in the art.

Computer software products may be written in any of various suitable programming languages, including C, C++, C#, Pascal, Fortran, Perl, Matlab (from MathWorks, www.mathworks.com), SAS, SPSS, JavaScript, CoffeeScript, Objective-C, Objective-J, Ruby, Python, Erlang, Lisp, Scala, Clojure, Java, and other programming languages. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the mobile communications device 10 may be the Android operating system, iPhone OS (i.e., iOS), Windows Phone, Symbian, BlackBerry OS, Palm web OS, bada, Embedded Linux, MeeGo, Maemo, Limo, Brew OS. Other examples of operating systems include one of the Microsoft Windows family of operating systems (e.g., Windows 95, 98, Me, Windows NT, Windows 2000, Windows XP, Windows XP x64 Edition, Windows Vista, Windows 7, Windows 8, Windows CE, Windows Mobile, Windows Phone 7), Linux, HP-UX, UNIX, Sun OS, Solaris, Mac OS X, Alpha OS, AIX, IRIX32, or IRIX64. Other operating systems may also be used.

Furthermore, the mobile communications device 10 may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. Data and other information may be passed between the mobile communications device and other components (or steps) of a system using a wireless network employing a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

2. Cross Device Notification

As noted in the Background, a typical user may have multiple electronic devices, such as a smartphone, tablet and laptop computer, each of which is capable of producing native notifications, such as arrival of email, text messages, phone calls, missed phone calls, appointments, and other events, in accord with the configuration of the device, either from the OS, or from one or more applications running on the OS. Further, each device has the ability to display the native notifications directly using the OS of the device, or through an application programming interface (API) that interacts with the OS.

In particular, on Android devices, an application with appropriate permissions can use its assistive technology to examine all native notifications of the device. On Windows and similar operating systems, one can hook the executables of applications or the operating system, for example, to examine windowing system message flow, or the contents of the display screens or the system task area, or to obtain information (metadata) about the notifications. On the Apple iOS, the assistance of the operating system is required to examine notification, or from individual applications that already receive notifications, and which could make those notifications available to the cross device notification system.

Ideally, a user should be able to view notifications on any of user's devices, and to respond to the notifications on only one of the devices, and to have that response be effective and applied on all of user's other devices.

Figure 3:
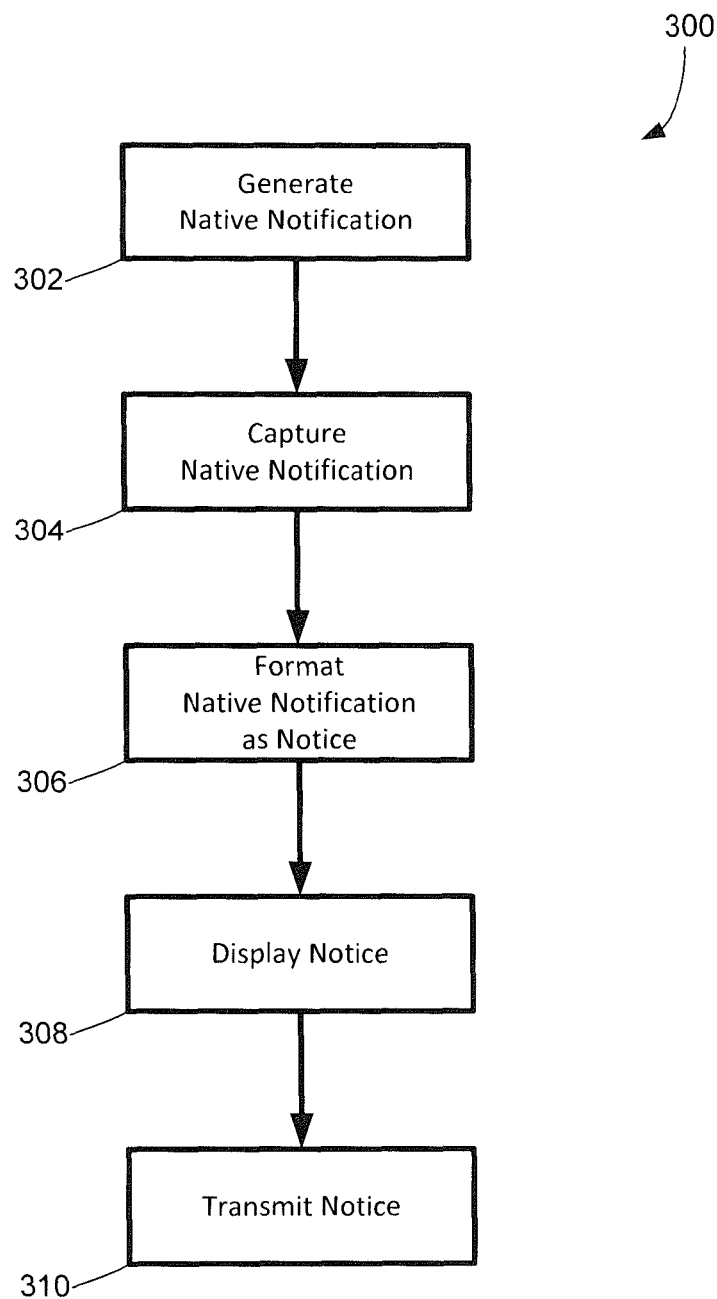
FIG. 3 is a flow chart illustrating a process for transmitting notifications to other devices.

A simple process 300 for transmitting notifications is shown in FIG. 3. In step 302, a native notification is generated on an originating device from the OS or a running application in accord with configured settings. In step 304, the native notification is captured by a cross-notification component on the originating device. In step 306, the native notification is formatted as a "notice" by the cross-notification component so that the notice may be readily sent to other devices with a format that is easy for a receiving device to understand and display, regardless of whether the other device is running the same application or OS. However, in some embodiments, the native notification need not be reformatted, but instead, presented in its native format, for example, when the other devices are running the same application or the same operating system, such that the other device recognizes and readily handles the notification format. In step 308, the originating device displays the notice, although this step is really optional for the cross-notification process, since the originating device already displays the native notification using a native display mode built into the either the operating system or an application running on the originating device. In step 310, the originating device transmits or broadcasts the notice to other devices across a communications link.

Figure 4:
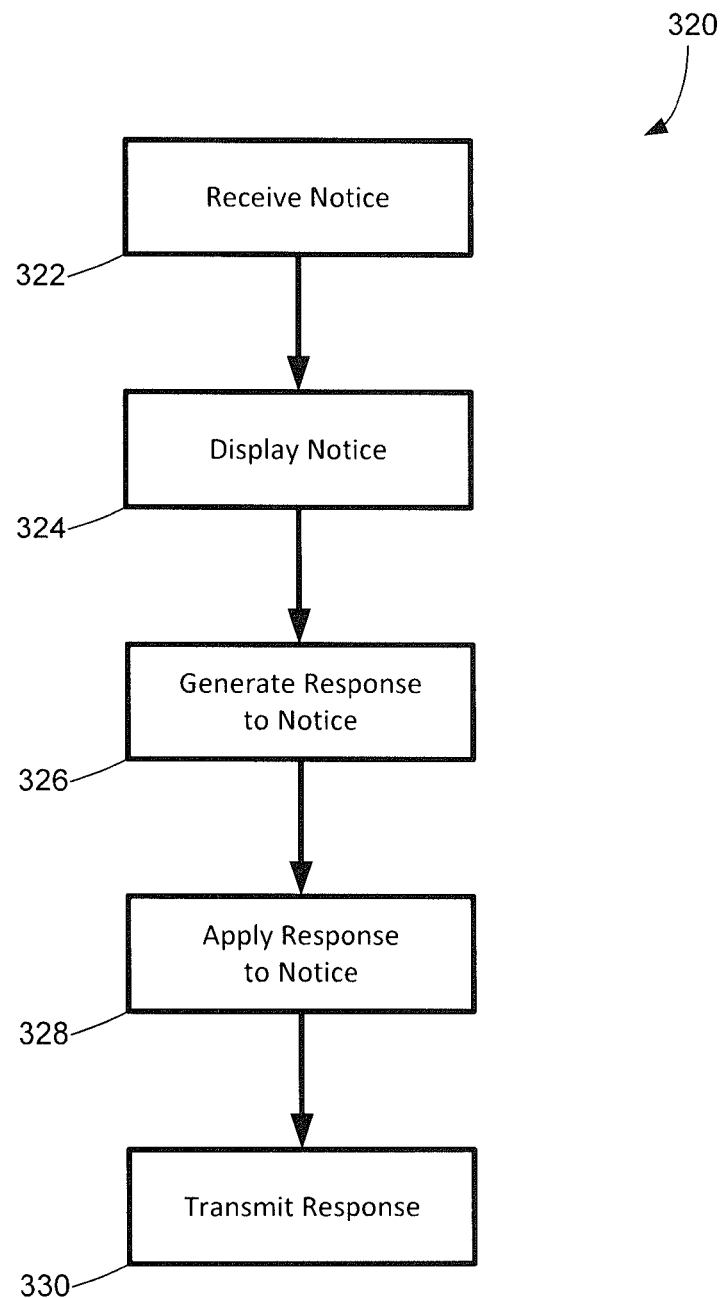
FIG. 4 is a flow chart illustrating a process for receiving notifications from other devices.

A simple companion process 320 for receiving notifications at devices other than the originating device is shown in FIG. 4. In step 322, the notice generated by the originating device from a native notification is received by a cross-notification component installed in the other device, i.e., the receiving device, via a communications link. In step 324, the notice is displayed on the receiving device. The cross-notification component of the receiving component effectuates display of the notice either using the native display capabilities of the receiving device through its OS, or through an API in either the cross-notification component or a resident application. Alternatively, the notice could be displayed in a web browser if the device is suitably configured.

In step 326, a response to the notice is generated by the user on the receiving device using an interface with the cross-notification component. The response may take a number of different forms, as further described below. The simplest response is a dismissal of the notice, which also acts as an acknowledgement that the notice was received. In step 328, the response is applied to the notice on the receiving device by the cross-notification component. For example, if the notice is dismissed, its display is removed from the receiving device. In step 330, the cross-notification component of the receiving device also transmits or broadcasts the response to the notice to any other devices that user has similarly configured. Those other devices will likewise be configured as described herein, either with the functionality for transmitting notices, or receiving and responding to notices, or both.

Figure 5:
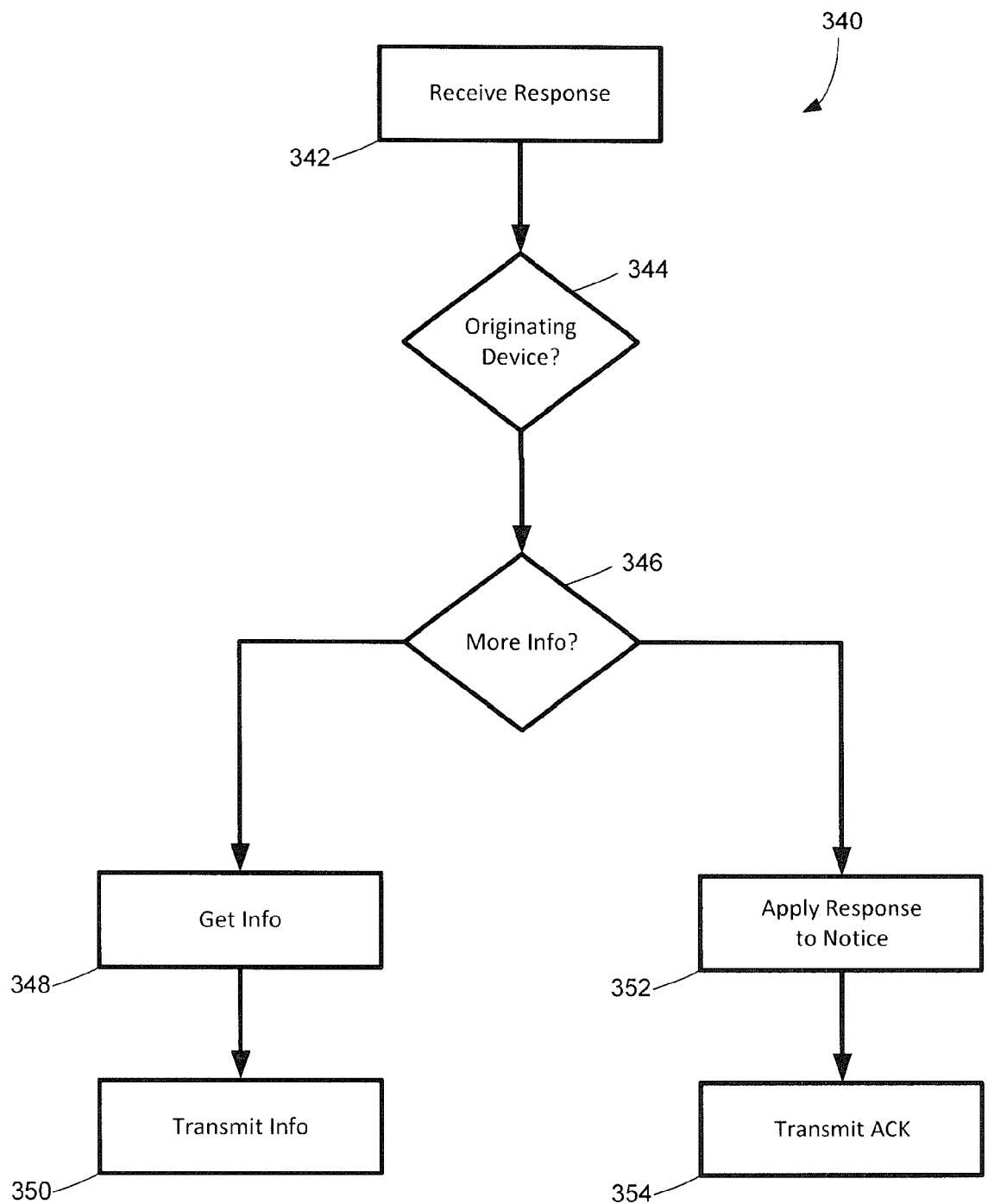
FIG. 5 is a flow chart illustrating a process for responding to notifications from other devices.

Referring now to FIG. 5, another companion process 340 is shown for receiving and applying responses to notifications at any other device. In step 342, a response to a notice is received in the cross notification component of the device. In step 344, the device determines whether the response is directed to a notice issued by this device, e.g., this device is the originating device. If so, then in step 346, the cross notification component of the device determines whether the response includes a request for more information about the notice, for example, if the notice is a complex notice (see discussion below). If the request does seek more information, then in step 348, the cross notification component of the device obtains the requested information, and in step 350, transmits the requested information.

If the response did not seek more information in step 346, then in step 352, the response is applied to the notice by the cross notification component of the device. In step 354, the device transmits an acknowledgement that the response has been received and applied.

If this device is not the originating device in step 344, then the cross notification component of the device simply applies the response to the notice in step 352, and sends an acknowledgement in step 354. This device had previously received the notice when it was originally transmitted by the originating device. The typical action in non-originating devices in simply to dismiss the notice, either permanently or temporarily.

Figure 6:
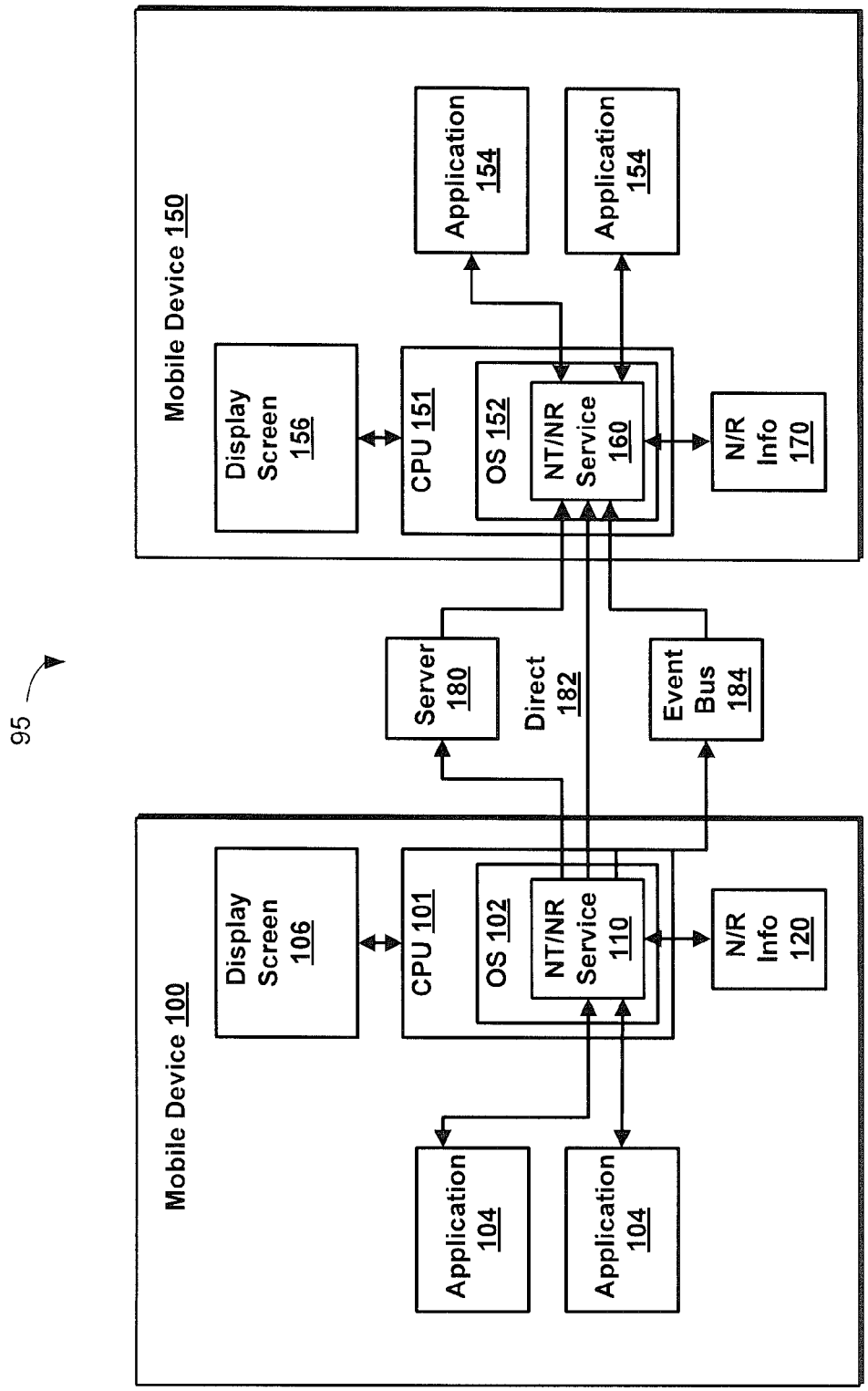
FIG. 6 is a block diagram illustrating a embodiment of a cross device notification system for a pair of mobile communications devices.

One embodiment of a cross device notification system 95 is shown in FIG. 6, which shows one client device 100 coupled to another client device 150 by one of several communications links 180, 182, 184 (described below). Devices 100 and 150 each include a cross-notification component 110 and 160, respectively, which is configured to send and receive notifications, display the notifications, and send and receive responses to notifications. It should be understood that there can be any number of client devices involved in the cross-device notification system, each of which may be configured to send or display notifications, to receive responses from other devices, or send notifications or responses to other devices. Further, the client devices may be organized into notification groups, as further described below.

Devices 100 and 150 are virtually identical, each having a processor 101, 151 controlled through an operating system 102, 152, and selectively running various applications 104, 154. Also included are a display screen 106, 156 and a file system 120, 170.

As noted above, each of the devices 100, 150 includes a cross-notification component 110, 160. The cross-notification component 110, 160 is preferably fully integrated with the operating system 102, 152 as shown, and performs transmission of notifications from an originating device and/or receipt of notifications in any device and/or response to notifications in any device and/or receipt of response to notifications in any device. In this embodiment, both devices 100, 150 have the same cross-notification component functionality; however, in some embodiments, fewer than all the functions may be enabled. For example, some devices may be configured only as receivers, and such devices will be enabled to receive notifications and transmit responses to notifications, but not transmit notifications.

Notifications may be generated from applications 104, 154, or by the operating systems 102, 152. Notifications from the operating systems may be thought of as "native notifications" since the generation and display of such notifications is inherent in the functionality of the operating system. When notifications are generated, they may be displayed on display screens 106, 156 in a variety of different ways. For example, notifications can be indicated in a special area, such as the notification bar in Android, or the system task area in Windows, or via windows or dialogs displayed in any operating system. Notifications can also be provided in toaster popups, or in on-demand viewing windows, or in panels that collect notifications from several applications.

When notifications or notices are generated by the cross device notification system of FIG. 6, for example, they may be displayed using the native abilities of the device and its operating system, or alternatively, the cross notification component may generate its own display graphics, for example, through an API.

In one example, the cross-notification component 110 on device 100 detects native notifications from the operating system 102 or one of the applications 104, and that native notification will be displayed on device 100 in accord with configuration settings. The cross-notification component 110 formats these native notifications as notices, and sends the notices over the designated communications link to one or more other devices enabled as a notification receiver, for example, cross-notification component 160 on mobile device 150. The cross-notification component 160 on device 150 is configured to receive notices from other devices, such as device 100; to generate and send a response to the notice back to the originating device 100 and to all other devices in the user's notification group; and to apply the response to the notice on the local device 150, for example, to dismiss the notice.

There are several options for coupling devices 100 and 150 with a communications link shown in FIG. 6. For example, the devices could have a direct communications link 182 using a standard communications protocol, such as Wi-Fi, Bluetooth, NFC, etc. The devices could also communicate via server 180, which may be configured with a cloud-based service with which notification transmitters and notification receivers communicate. The devices could also communicate via an event bus 184 to which notification events and notification response events may be posted.

There are also hybrid options in which a server or cloud-based service may be used for a device rendezvous, namely, where the devices locate each other, but subsequently use a different communication mechanism to communicate among themselves. For example, using a direct communications protocol, the devices may initiate the communication via the protocol itself, or instead by using a directory-style lookup to obtain an IP address. Also, a notification receiver could be a web server running on the device having an address that was communicated via a discovery process or directory lookup to a notification transmitter.

A notification receiver can be configured to maintain a persistent connection to the notification transmitter through the direct link 182 or the cloud-based service 180, regardless of which side initiated the connection. The notifications can also be obtained via a periodic connection initiated from either end, such as polling in a push or pull scenario. The event bus 184 is typically connected logically to all devices that are registered with or listening to the event bus.

Display of notifications can be made in a number of different ways. For example, a web-based notification receiver displays the notifications within a web browser window. A native application notification receiver can display the notifications within an application window, or instead, the notification can be funneled through a native notification mechanism provided by the operating system/platform, such as toaster popups, system tray icons, etc.

Alternatively, communication between a notification transmitter and a notification receiver, or a notification transmitter and a cloud-based service, or a cloud-based service and a notification receiver, could be performed via email, SMS text message, instant messaging protocol or application, or other known methods.

In one embodiment, notices are only delivered to a notice receiver on a device when it is detected that the device is currently active. For example, if there has been some sort of user interaction on the device within a certain configurable amount of time, then the device will be considered active. If a device that was inactive becomes active again, e.g., because the user has interacted with it, the notice receiver is enabled to receive future notices. However, the device could also communicate with one or more notice transmitters or the cloud-based service to request that any notices not sent while the device was inactive now be sent.

The following scenario illustrates the usefulness of providing cross device notifications. Assume the user has a laptop, a smartphone, and a tablet. The user is working on the laptop, and has silenced the ringer on the cell phone so as not to be disturbed. A call or text message arrives at the cell phone, and a notice of these events is generated and sent to the laptop where it is displayed. Note that the user can configure a set of rules for the notices, i.e., how to bring notices to the user's attention. For example, one rule could have the laptop make a ringing sound when a notice is received that there is an incoming phone call on the user's smartphone.

The user then goes to a meeting with only the tablet, and while giving a presentation at the meeting, the user "pauses" the notice receiver function on the tablet. Upon finishing the presentation, the user can "un-pause" the notice receiver, and any notices that were missed from the smartphone or the laptop are delivered to the tablet. After the meeting, the user goes out to lunch with co-workers, bringing along the smartphone but not the laptop and the tablet. While at lunch, the user receives a notice from the laptop that three new emails have been received, and also that his mother tried to initiate a Skype session.

Figure 7:
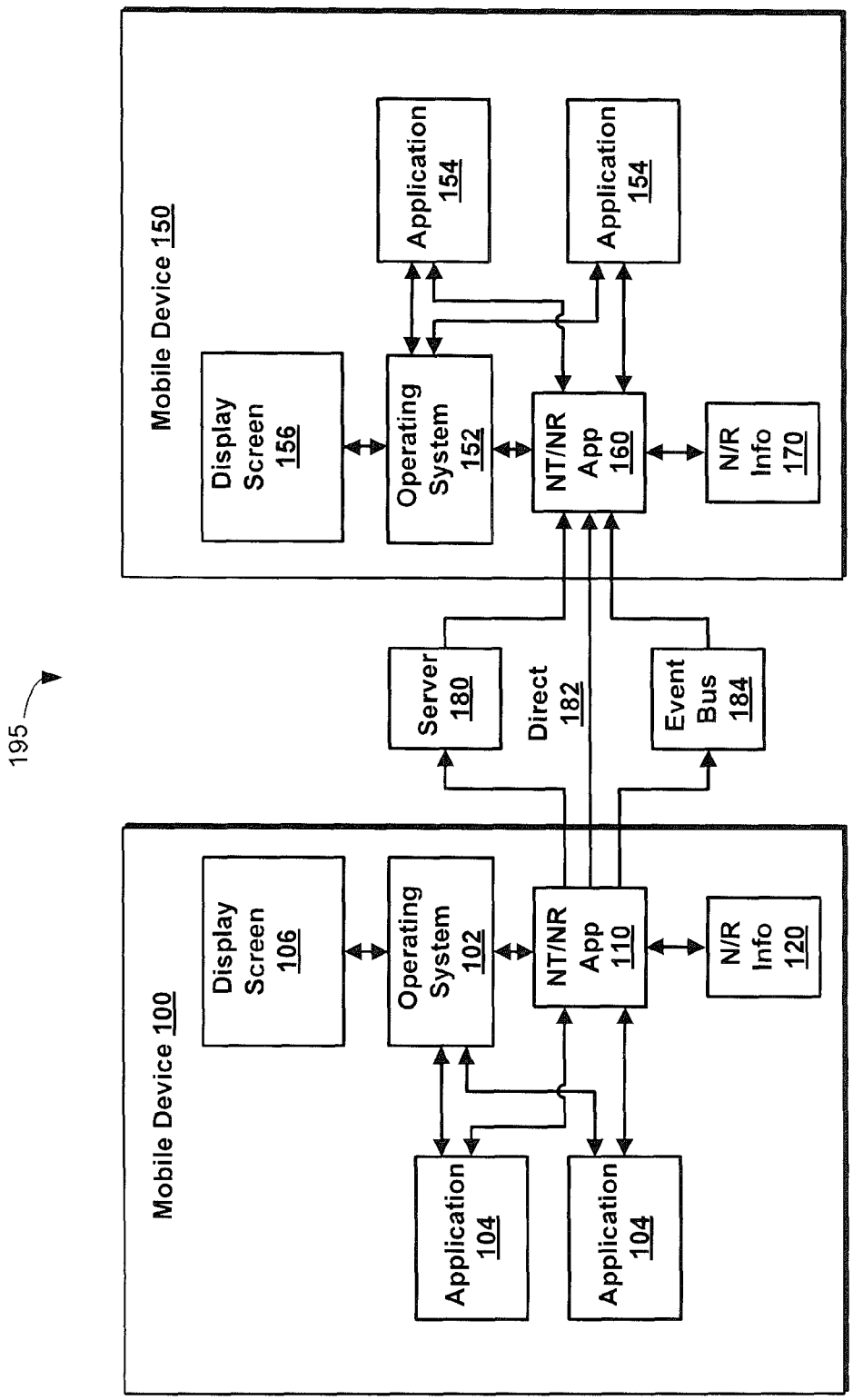
FIG. 7 is a block diagram illustrating an alternative embodiment of a cross device notification system for a pair of mobile communications devices.

An alternative embodiment of a cross device notice system 195 is shown in FIG. 7, which is similar to the system 95 of FIG. 6, except that the cross-notification components 111 and 161 shown in FIG. 7 are not integrated with the operating systems 102 and 152, respectively, but are installed as application layers on the operating system. This may mean that the cross-notification components do not have direct access to the native notification and display features of the operating system. However, in all other respects, the functionality of the cross-notification components are the same as previously described.

Notification groups may be administered by configuring settings regarding which notifications can be sent to which devices from which sources. Policies may be established which require or prohibit sending of notifications from certain sources or to certain destination devices. A source of notifications can be classified as being in a certain categories, and policies applied to particular categories. Notification messages themselves can be classified as belonging to a certain category, and policies or settings can be established to enable or suppress the forwarding of such notifications and responses; e.g., notifications from enterprise applications or banking applications may be excluded.

3. Content and Format of Cross-Device Notices

Cross-device notices generated from native device notifications can include information about a wide variety of events, such as incoming or missed phone calls, new voice-mail messages, new emails or news items, or new text messages. Further, a notice can include the entire text of a communication, or in the case of voicemail, the entire recorded voicemail message, or a portion thereof, or metadata about the communication. To provide different measures of content, the notices and responses generated from native device notifications can be either simple or complex or structured.

A simple notice consists of a set of text or images or other media which are presented to the user, and for which the response is a simple acknowledgement and dismissal of the notice.

A complex notice is one in which there are many different responses possible besides simply dismissing the notice, or in which there are several notices collected together.

A structured notice is one in which a structured dialog language is used to represent the notice and possible responses; a structured notice can be easily transported across different device architectures and operating systems and rendered as appropriate locally. One example of a structured notice program module is shown in FIG. 8.

Figure 9:
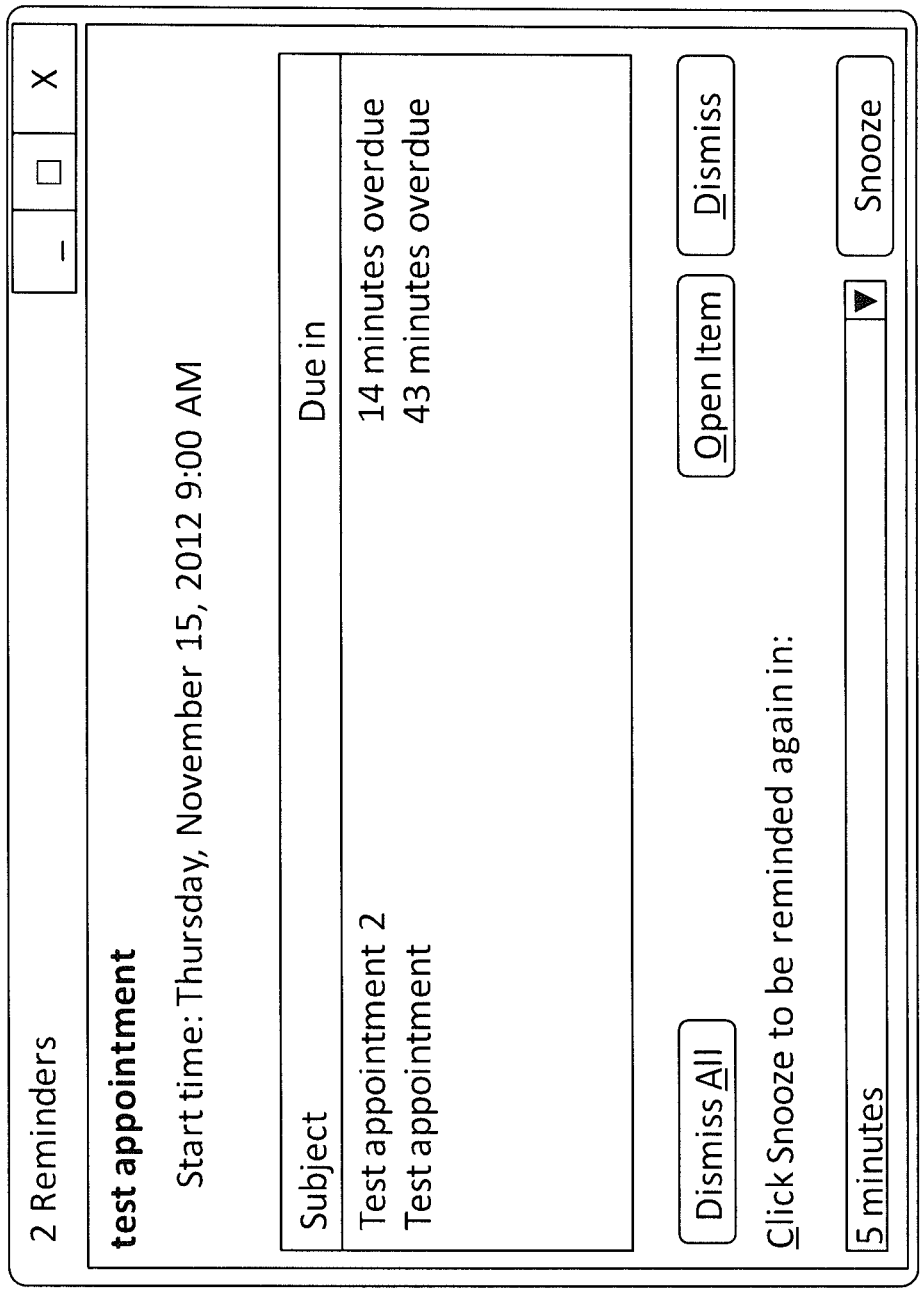
FIG. 9 is an example of a complex notice.

Referring now to FIG. 9, a complex notice is illustrated in the form of a reminder popup window, such as generated from Microsoft's Outlook program. In this example, two notices appear in a list, one for "test appointment" and one for "test appointment 2." Further, there are four different possible responses:

DISMISS—to dismiss one or more selected notices;
DISMISS ALL—to dismiss all notices in the list;
OPEN ITEM—to viewing additional information about a notice; and
SNOOZE—to dismiss selected notices for a specified time period, after which the notices will reappear.

In one embodiment, a complex notification may be mapped onto individual simple notifications. For example, the complex notice shown in FIG. 9 may be broken up into individual notifications for "test appointment" and "test appointment 2." Further, the cross-device notification component could be configured to omit multiple response choices in favor of a single response choice, e.g., dismissing the notice.

As another example, a notice receiver may be configured to offer the user the choice of temporarily dismissing any notice for a specified period of time, regardless of whether the application generating the native notification supports such an option. To do so, the notice receiver is configured to temporarily remove the notice and redisplay it later. In that case, the notice receiver also informs the other devices in the group that the notice has been temporarily removed, and these other devices can also be configured to temporarily remove the notice and display it later.

In another embodiment, the notice transmitter or receiver may include an option to forward the notice to a different user, such as the primary user's administrative assistant or another person empowered to view and act upon the notices. In this case, the notice is sent to the notification group for the other user. The act of forwarding the notice can be a "send and forget" communication, or it can be one which retains information about the notice until such time as the forwarded user has acknowledged the notice and responded, or until a certain time period has expired and the notice is redisplayed on the original device. An historical log of notifications and responses can be made available to the user, including information about forwarding and subsequent acknowledgement. Further, all information about the sending, receipt, viewing, and responding to notices may be held at a server or cloud-based server as part of a non-repudiation based audit trail.

If a complex notice offers multiple response options other than different forms of dismissal (permanently or temporarily), such as "OPEN ITEM," then the notice transmitter and receiver modules can be configured to support this more complex type of interactive response. For example, the notice receiver can display the choice "OPEN ITEM" to the user. If the user selects this choice, then the notice receiver informs the original notification sender and requests any additional information that is available when that choice is made locally. The notification sender performs the "Open Item" action on its local system, and transmits the resultant information (text and/or images of windows, etc.) to the notification receiver, as a sub-notification. A sub-notification is a notification that has an hierarchical relationship with another notification. Dismissing a sub-notification does not dismiss the parent notification, unless an explicit choice is presented to the user and the user has chosen to dismiss this sub-notification and its parent notification.

In another embodiment, a notification transmitter may be configured to transform a complex notice into a structured notice before sending it.

Notifications can be received and responded to differently on different devices, according to settings made by a user or administrator and according to the capabilities and norms of a particular device or operating system. For example, a user can configure a particular device to receive notifications via SMS text messages (batched or individually), and to respond to them on that device via SMS text messages.

A user can also connect to a web server or other application from a device that is not part of a defined notification group, for example, by authenticating properly, and still view or respond to the user's notifications.

A notification receiver can also be configured to identify duplicate notifications and present them just once to a user, but to respond as directed to all sources of the duplicate notification. For example, if a user has the same email application on two different devices, both of which are connected to an email server, then both instances of the application will generate notifications for each new item of received mail. If the user is currently using a third device, the user might see two different notifications for this single new item of received email, one sent from the first device, the other sent from the second device.

A user can define a specific notification group to include various devices of the user, as well as other users and their devices. Establishing such groups is generally known. For example, individual devices may be identified by IP address. Further, a user may enable the roles of listener, delegate, and peer for his notifications. A listener is a person whose personal notification group is a subscriber to the notification group of a primary user; that is, the listener's notification group is subscribed to receive notifications from the primary user's notification group, but cannot respond to them across the different notification groups, unless specifically configured to do so. Typically, the foreign notification group only has the option of dismissing the notification locally from the listener's notification group. A delegate is a person who is a listener, but who has been given permission to respond to the notifications on behalf of the primary user. This type of notification response from a delegate is propagated back into the primary user's notification group. A peer is a person with a bidirectional delegate relationship with a primary user. Each peer can view and respond to notifications on behalf of the other. All of the roles (listener, delegate, and peer) can be limited to certain categories of notifications based on application or source category, or based on classification of individual notification messages.

4. Conclusion

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for providing notifications from a first computing device to at least one other computing device, comprising:

capturing, by a first cross-notification component on the first computing device, a native notification from the operating system of the first computing device or from an application running on the first computing device, wherein the first computing device is a member of a plurality of computing devices, wherein each of the plurality of computing devices has a cross-notification component, and wherein the plurality is associated with a single user;

formatting, by the first cross-notification component, the captured native notification as a first notice;

causing, by the first computing cross-notification component, the first notice to be displayed by the first computing device;

causing, by the first cross-notification component, the first notice to be transmitted to all other devices of the plurality of computing devices; and receiving, by the first cross-notification component, from one of the plurality of computing devices, a response to a notice, wherein if the response relates to the first notice transmitted by the first computing device, then the response is applied to the first notice by the cross-notification component and the response is also applied to the native notification by the operating system of the first computing device or by the application running on the first computing device, and wherein if the response relates to a second notice that was received by the plurality of computing devices from a second computing device of the plurality of computing devices, then the response is applied to the second notice by the first cross-notification component.

2. The method of claim 1, further comprising:
receiving, by the first computing device, a third notice from a computing device other than the first computing device, and
displaying the third notice on the first computing device.

3. The method of claim 1, wherein the transmitting step and the receiving step further comprise using a direct communication protocol between the first computing device and at least one other computing device of the plurality.

4. The method of claim 1, the transmitting step further comprising the first computing device transmitting the first notice via a communications network to a server, wherein the server further transmits the first notice to at least one other computing device via the communications network.

5. The method of claim 4, the receiving step further comprising the first computing device receiving the response from a server via a communications network.

6. The method of claim 1, further comprising coupling the first computing device and at least one other computing device of the plurality to a logical event bus, wherein the transmitting step further comprises the first computing device transmitting the first notice via the event bus, and wherein at least one other computing device of the plurality receives the first notice from the event bus.

7. The method of claim 1, the formatting step further comprising:
converting data from the native notification into a simple format for the first notice, with a single response choice.

8. The method of claim 1, the formatting step further comprising:
converting data from the native notification into a complex format for the first notice, with multiple response choices.

9. The method of claim 1, the formatting step further comprising:
presenting data and choices from the native notification into a structured format for the first notice.

10. The method of claim 1, the formatting step further comprising:
presenting the native notification in its native format for the first notice.

11. The method of claim 1, the receiving step further comprising:
receiving, by the first computing device, a request for additional information regarding the first notice;
obtaining, by the first computing device, the additional information; and
transmitting, by the first computing device, the additional information from the first computing device.

12. The method of claim 1, further comprising:
classifying the first notice, and transmitting the classification along with the first notice.

13. The method of claim 1, the displaying step further comprising displaying the first notice using a native notification display component of the first computing device.

14. A method for receiving notifications from a first mobile communications device at a remote computing device, comprising:
receiving, by a first cross-notification component on the remote computing device, a first notice from the first mobile communications device, wherein the first notice is generated on the first mobile communications device from a native notification issued by an operating system of the first mobile communications device or by an application running on the first mobile communications device, wherein the remote computing device and the first mobile communications device are members of a plurality of computing devices, wherein each of the plurality of computing devices has a cross-notification component, and wherein the plurality is associated with a single user;
causing, by the first cross-notification component, the first notice to be displayed on the remote computing device; and
causing, by the first cross-notification component, a response to the first notice to be transmitted to all other devices of the plurality of devices; and
applying, by the first cross-notification component on the remote computing device, the response to the first notice.

15. The method of claim 14, further comprising:
receiving, by the first cross-notification component, a response to a second notice from a computing device of the plurality other than the first mobile communications device; and
applying, by the first cross-notification component, the response to the second notice.

16. The method of claim 14, wherein the transmitting step and the receiving steps further comprise using a direct communication protocol between the remote computing device and the first mobile communications device.

17. The method of claim 14, the transmitting step further comprising the remote computing device transmitting the response to the first notice via a communications network to a server, wherein the server further transmits the response to the first notice to the first mobile communications device via the communications network.

18. The method of claim 14, further comprising coupling the remote computing device and the first mobile communications device to a logical event bus, wherein the receiving steps further comprise the remote computing device receiving the first notice or the response to the second notice via the event bus, and wherein at least one other computing device of the plurality receives the first notice or the response to the second notice from the event bus.

19. The method of claim 14, the displaying step further comprising configuring the display of the first notice on the remote computing device.

20. The method of claim 14, the step of receiving the first notice further comprising only receiving the first notice when the remote computing device is active.

21. The method of claim 20, wherein the remote computing device is active if it has been in use within the preceding preset time period.

22. The method of claim 20, further comprising initiating a pause mode, wherein notices to the remote computing device are suspended during the pause mode.

23. The method of claim 14, the displaying step further comprising:
   formatting the first notice prior to display.

24. The method of claim 23, the formatting step further comprising:
   modifying a complex format in the first notice to a simple format.

25. A method for receiving notifications from a first computing device at a remote computing device, comprising:
   receiving, by a first cross-notification component on the remote computing device, a notice from the first computing device, wherein the notice is generated by the first computing device from a native notification issued by an operating system of the first computing device or by an application running on the first computing device, wherein the remote computing device and the first computing device are members of a plurality of computing devices, wherein each of the plurality of computing devices has a cross-notification component, and wherein the plurality is associated with a single user;
   causing, by the first cross-notification component, the notice to be displayed on the remote computing device; and
   receiving, by the first cross-notification component, a response to the notice from another computing device; and
   applying, by the first cross-notification component, the response to the notice.

* * * * *